United States Patent
Choi et al.

(10) Patent No.: US 7,961,641 B1
(45) Date of Patent: Jun. 14, 2011

(54) INITIAL RANGING POWER CONTROL ALGORITHM FOR WIMAX MOBILE STATIONS

(75) Inventors: Jihwan P. Choi, Santa Clara, CA (US); Jiwon S. Han, San Ramon, CA (US); Jungwon Lee, Cupertino, CA (US)

(73) Assignee: Marvell International Ltd., Hamilton (BE)

( * ) Notice: Subject to any disclaimer, the term of this patent is extended or adjusted under 35 U.S.C. 154(b) by 198 days.

(21) Appl. No.: 12/109,320

(22) Filed: Apr. 24, 2008

Related U.S. Application Data

(60) Provisional application No. 60/914,490, filed on Apr. 27, 2007.

(51) Int. Cl.
*H04J 1/16* (2006.01)
(52) U.S. Cl. ......... 370/252; 370/241; 455/421; 455/425
(58) Field of Classification Search .................. 370/241, 370/252; 455/403, 421, 422.1, 423–425, 455/466
See application file for complete search history.

(56) References Cited

U.S. PATENT DOCUMENTS

| | | | |
|---|---|---|---|
| 5,940,743 A * | 8/1999 | Sunay et al. .................... 455/69 |
| 6,101,179 A * | 8/2000 | Soliman ......................... 370/342 |
| 6,353,729 B1 * | 3/2002 | Bassirat ........................ 455/11.1 |
| 6,948,184 B1 * | 9/2005 | Del Sol et al. ................. 725/111 |
| 2003/0013466 A1 * | 1/2003 | Ahn ............................... 455/466 |
| 2004/0176027 A1 * | 9/2004 | O'Neill ............................ 455/7 |
| 2005/0259584 A1 * | 11/2005 | Chen et al. ...................... 370/238 |
| 2006/0013287 A1 * | 1/2006 | Normark et al. ............... 375/142 |
| 2007/0060180 A1 * | 3/2007 | Muharemovic et al. ...... 455/509 |
| 2008/0095272 A1 * | 4/2008 | Normark et al. ............... 375/316 |

OTHER PUBLICATIONS

T. Pratt, C. Bostian, and J. Allnutt. Satellite Communications, John Wiley & Sons, Inc. 2nd Ed., pp. 142.*
IEEE Std 802.16e-2005 and IEEE Std 802.16-2004/Cor1-2005 (Amendment and Corrigendum to IEEE Std 802.16-2004); IEEE Standard for Local and metropolitan area networks, Part 16: Interface for Fixed and Mobile Broadband Wireless Access Systems, Amendment 2: Physical and Medium Access Control Layers for Combined Fixed and Mobile Operation in Licensed Bands and Corrigendum 1; IEEE Computer Society and the IEEE Microwave Theory and Techniques Society, sponsored by the LAN/MAN Standards Committee, IEEE New York, NY, USA.

* cited by examiner

*Primary Examiner* — William Trost, IV
*Assistant Examiner* — Ashil Farahmand

(57) ABSTRACT

A device and method for connecting to a WiMAX network can determine an initial signal strength as a function of an uplink propagation path loss between a mobile device and a base station, a noise and interference level value for the base station, a normalized carrier-to-noise value for ranging, and an offset value. If a connection is not established at the initial signal strength, a signal can be retransmitted at a signal strength equal to the initial signal strength plus a step value, where the step value can be determined by designating a fixed number of steps to be used before reaching maximum transmission power.

16 Claims, 3 Drawing Sheets

INITIAL RANGING POWER CONTROL ALGORITHM FOR WIMAX MOBILE STATIONS

CROSS REFERENCE TO RELATED APPLICATION

The present application claims the benefit of co-pending U.S. provisional application Ser. No. 60/914,490 filed on Apr. 27, 2007. The disclosure of the co-pending provisional application is incorporated herein by reference in its entirety.

FIELD OF THE DISCLOSURE

The present disclosure relates generally to the field of wireless networks, more particularly to wireless networks implementing the WiMAX protocol, and still more particularly to a system and method for efficiently adjusting the transmission power of a device attempting to connect to a wireless network.

BACKGROUND

Many modeRN mobile devices such as smartphones contain processors with speeds exceeding 600 MHz, and it is contemplated that future generation products will be even faster, and will have even more processing capabilities. In order to fully utilize the processing capabilities of such a device, certain applications need to send and receive large amounts of data over a wireless network. In order to maximize both the mobility of the device and the processing capabilities of the device, the wireless network will have both a large range and a high data transfer rate. One common solution used in the art is to have the device connect to a cellular phone network such as CDMA, GSM, GPRS, or EDGE, or to a wireless network such as a WiFi network. Both these solutions, however, have limitations. Cellular phone networks do not provide a high enough data transfer rate to run certain applications, and WiFi networks have limited ranges (typically less than 200 meters), significantly limiting the mobility of a device.

In light of the shortcomings of the aforementioned network architectures, a new wireless network protocol called Worldwide Interoperability for Microwave Access or "WiMAX" has emerged. WiMAX has a range comparable to cellular phone networks and data-transfer rates comparable to WiFi networks. The base stations in a WiMAX network can frequently transmit data over a greater than 10-mile radius. Therefore, in order to fully utilize the base station's transmission range, a mobile device must also be able to transmit at a signal strength sufficient to cover the same range. For instances when a mobile device is not at the outer limits of a base station's transmitting range, less transmitting signal strength is required. In order to reduce battery consumption in a mobile device, it is therefore desirable for a mobile device to be able to dynamically adjust its transmitting signal strength as its distance from a base station changes.

In order to establish an initial connection between a WiMAX base station and a mobile device, the base station can send out a broadcast message containing information identifying the base and network information, and upon detecting a broadcast message, a mobile device can send out a known sequence called a ranging sequence to the WiMAX base station. When initially sending out the ranging sequence, the mobile device does not know the parameters needed to determine an appropriate transmission strength. One possible solution is to always send out the initial ranging sequence at a maximum power level. This solution, however, has several shortcomings, such as unnecessary battery power consumption and the potential creation of unnecessary interference for other wireless signals. Additionally, the IEEE 802.16e standard governing the WiMAX protocol dictates that a device must revert to a minimum signal transmission strength if a transmission at maximum strength is unsuccessful. Reverting to minimum signal strength could lead to increased network entry times in instances when the initial ranging sequence does not successfully establish a network connection. Initially transmitting the ranging sequence at an insufficiently low signal strength also can increase network entry time due to repeated unsuccessful network entry attempts.

Therefore, there exists in the art a need for an efficient algorithm for determining the initial power level at which to transmit the ranging signal. Additionally, there exists in the art a need for an algorithm for determining how to adjust the signal strength of the transmission should the first transmission not result in a network connection. Aspects of the present invention include an algorithm that addresses these needs by increasing the probability of establishing a connection with the base station while at the same time reducing unnecessary power consumption by the mobile device.

SUMMARY

Aspects of the present invention include determining a value for an uplink propagation path loss (L) between a mobile device and a base station, determining a noise and interference level (NI) value for the base station, determining a normalized carrier-to-noise (C/N) value for ranging, and determining an offset value. A further aspect of the present invention includes determining an initial signal transmission strength as a function of L, NI, C/N, and the offset value, and transmitting a ranging sequence from a mobile device to a base station at the determined initial signal strength.

Additional aspects of the present invention include retransmitting the ranging sequence at a signal strength equal to the initial signal strength ($P_{INITIAL}$) plus a step value (D) if the device does not receive a ranging response from the base station in response to initially sending the ranging sequence. The step value can be determined by designating a fixed number of steps (K) to be used before reaching maximum transmission power ($P_{MAX}$), which can be calculated from the parameters given by the base station in the broadcast message. Therefore, the value of D can be ascertained by $D=(P_{MAX}-P_{INITIAL})/K$. The signal transmission strength for sending the ranging sequence can be incremented by D until either a connection with the network is established or $P_{MAX}$ is reached.

DETAILED DESCRIPTION

Figure 1:
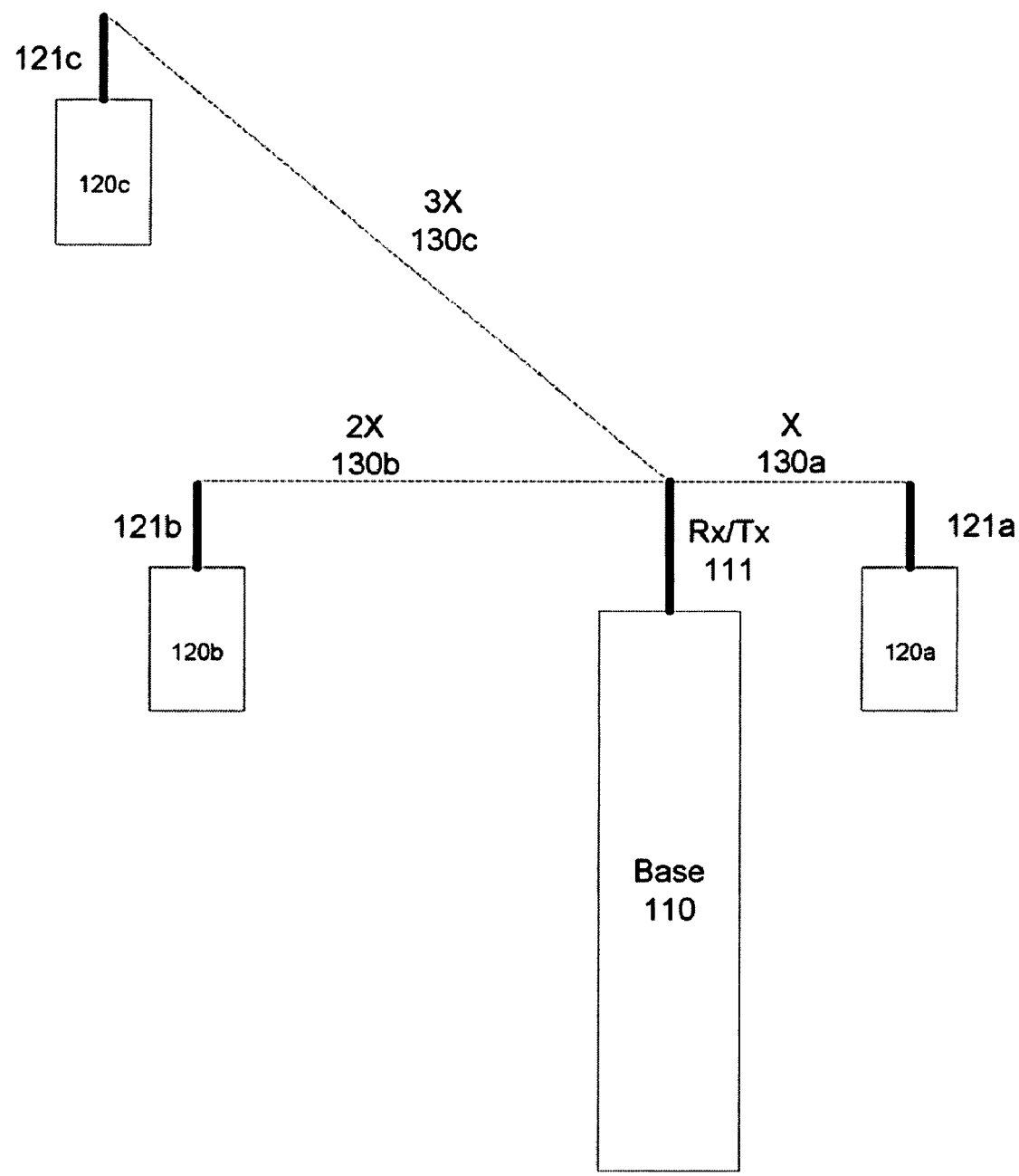
FIG. 1 illustrates a network that could be used to implement aspects of the present invention.

FIG. 1 shows a network, such as a WiMAX network, that can be used for implementing aspects of the present invention. The network consists of a base station transceiver 110 with an antenna 111. The transmitting range of the base station 110 might be over ten miles. Mobile transceiving devices 120a-c also with antennas 121a-c can be configured to connect to the network. The mobile devices 120a-c may all be different distances (shown by the dotted lines 130a-c) from the base station. For example, the device 120a might be a distance X from the base station 110. Device 120b might be twice as far away, and device 120c might be three times as far away. Because the signal strength needed to communicate with the base station will vary as its distance from the base station 110 changes, mobile devices 120a-c can be configured to adjust their signal transmission strengths in order to minimize power consumption.

Prior to connecting to the network, however, a device 120a-c does not know all the parameters needed to determine an appropriate signal strength. Accordingly, an aspect of the present invention includes an algorithm for determining the signal strength at which to initially transmit a ranging sequence.

Figure 2:
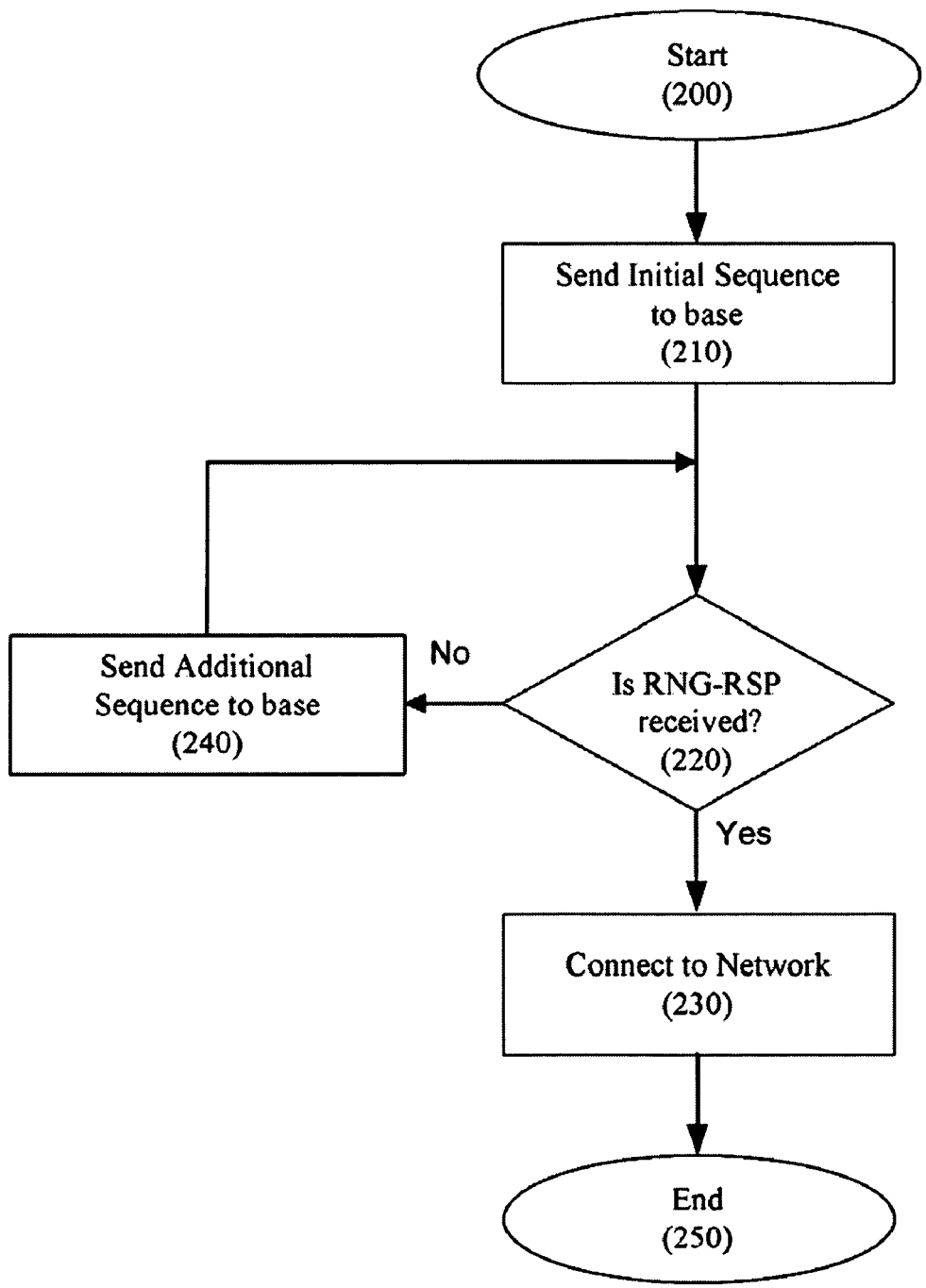
FIG. 2 is a flow chart illustrating a method that embodies aspects of the present invention.

FIG. 2 shows a flow chart for a method of establishing a network connection between a WiMAX mobile device and a WiMAX base station. A mobile device can send a ranging sequence, such as a CDMA initial ranging code, to a base station (block 210). The known sequence can be sent at an initial power level ($P_{INITIAL}$). The device can then wait to determine if a ranging response is received from the base station (block 220). If a ranging response is received, then the device can connect to the network (block 230), and the method can end (block 250). If the device does not receive a ranging response from the base station after a period of time, such as 60 milliseconds, then the device can resend the ranging sequence to the base station at a higher signal strength (block 240). After the ranging sequence is resent, the device can again wait to determine if a ranging response is received (block 220), and if it is, connect to the network (block 230). If it is not, then the device can send another sequence to the base station at an even higher signal strength (block 240), and this process can repeat itself until a ranging response is received and the device connects to the network.

When configuring a device to implement the method of FIG. 2, a number of performance tradeoffs need to be considered. For example, sending the initial sequence to the base station (block 210) at a maximum power level can increase the probability of receiving a ranging response and minimize network entry time, but it also can cause unnecessary power consumption. Conversely, sending the ranging sequence at too low a signal power will result in increased network entry time because of the possible need for a greater number of ranging iterations. Accordingly, an aspect of the present invention can include sending the ranging sequence at less than a maximum transmission strength ($P_{MAX}$). The signal strength ($P_{INITIAL}$) for initially transmitting the ranging sequence can be found by the following equation:

$$P_{INITIAL}=L+NI+C/N+\text{offset}$$

L=the uplink propagation path loss and can be calculated by L=$BS_{EIRP}$−RSSI, where RSSI equals a received signal strength indication determined by a device and $BS_{EIRP}$ equals the equivalent isotropic radiated power of the base station, the value of which can be included in a base station's broadcast message.

NI=noise and interference level. A new value for NI might be contained in a base station's broadcast message. Otherwise, an NI value used in previous connection attempts can be reused. A mobile device can be configured to store a number of previous NI values.

C/N=normalized carrier-to-noise value for ranging. A value for C/N might be contained in a base station's broadcast message. Otherwise, a default value for C/N might be used. For example, a default value of 3 dB, as defined in IEEE Standard 802.16e, might be used.

Offset=a correction term determined by a mobile device. When a new offset value is not known before connecting to the network, the most recently used offset value can be reused (i.e. the mobile device can store the most recent offset value) or the device can use a default value.

If transmitting the ranging sequence at a signal strength equal to $P_{INITIAL}$ does not result in a network connection, then the ranging sequence can be resent a first time at a signal strength equal to $P_{INITIAL}$+D, a second time at a signal strength of $P_{INITIAL}$+2D, and so on until a network connection is established, where D represents an amount of increase in signal strength (in the dB scale, for example). An aspect of the present invention includes determining the value of D as a function of $P_{MAX}$ and $P_{INITIAL}$. A mobile device can be configured to use a fixed number (K) of steps before transmitting at $P_{MAX}$. Therefore, the value of D will be equal to ($P_{MAX}$−$P_{INITIAL}$)/K.

For example, if K equals 2, then the mobile device will send a first ranging sequence at a signal strength equal to $P_{INITIAL}$, resend the ranging sequence a first time at $P_{INITIAL}$+D, where D=($P_{MAX}$−$P_{INITIAL}$)/2, and resend the ranging a signal a second time at $P_{MAX}$.

Figure 3:
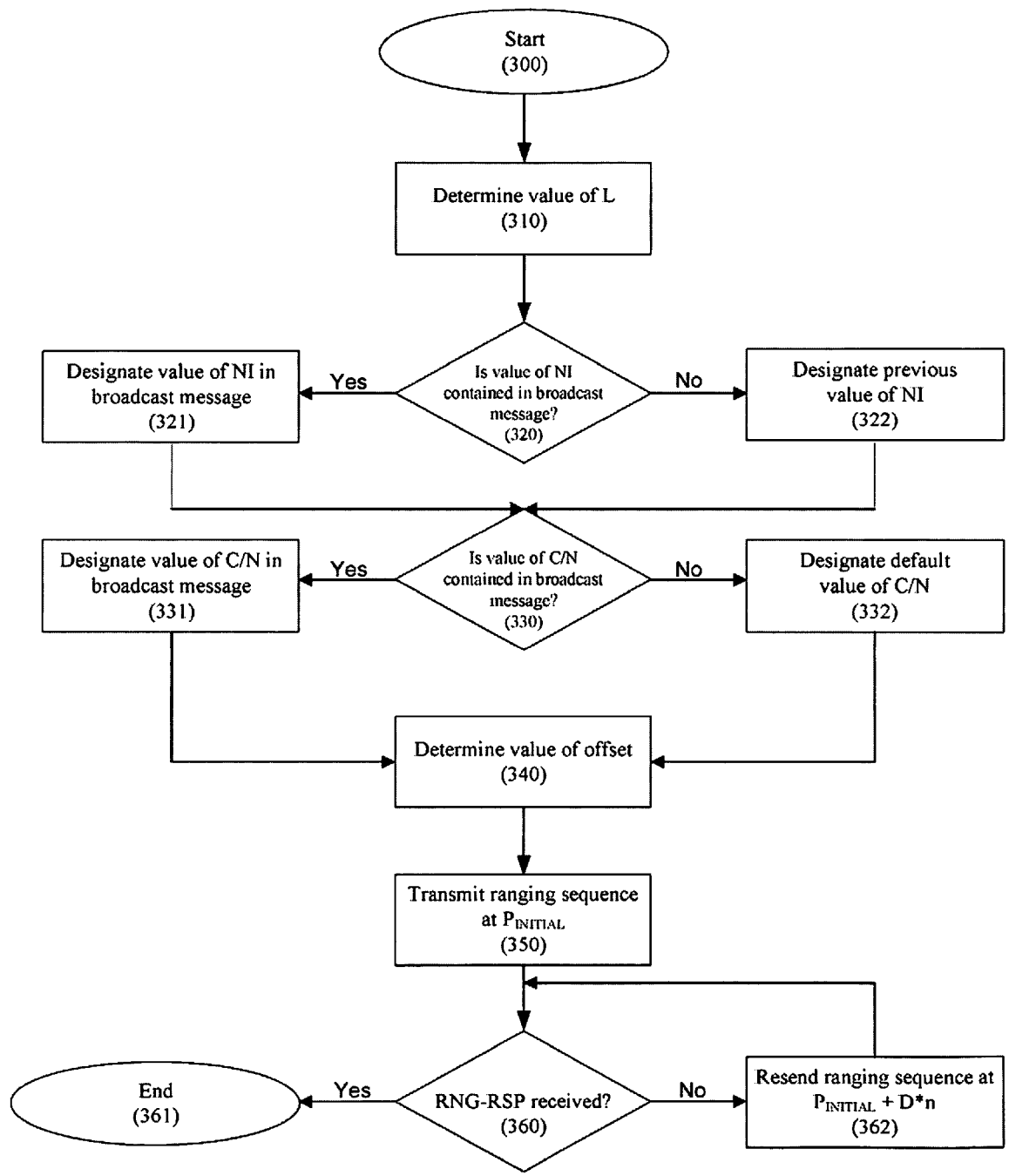
FIG. 3 is a flow chart illustrating a method embodying aspects of the present invention.

FIG. 3 shows a flow chart illustrating a method embodying aspects of the present invention. The method begins when a device attempts to connect or reconnect to a network (block 300). The device next determines a value of the uplink propagation path loss (L) of the base station (block 310). The value of L can be determined by $BS_{EIRP}$−RSSI, where the value of $BS_{EIRP}$ is contained in a base station's broadcast message and the value of RSSI can be measured by a mobile device.

The mobile device can also decode the base station's broadcast message to ascertain if a value for NI is present (block 320). If it is, then the mobile device can designate that value for NI (block 321, the "yes" path). Otherwise, it can designate a previously used value for NI (block 322, the "no" path).

The mobile device can further decode the base station's broadcast message to ascertain if a value for C/N is present (block 330). If it is, then the mobile device can designate that value for N/I (block 331, the "yes" path). If it is not, then the device can designate a default value for N/I, such as 3 dB (block 332, the "no" path).

The mobile device can further determine an offset value (block 340). The offset value might be determined by reusing a previous offset value, or using an offset value determined by a different signal transmission algorithm governing a different aspect of signal transmission.

After determining values for L, NI, C/N, and the offset, a mobile device can calculate an initial signal strength using the calculations discussed above, and transmit a ranging sequence at the calculated signal strength (block 350). After transmitting the ranging sequence, the device can wait to receive a range response signal (block 360). If it receives a range response (the "yes" path), then the device is connected to the network, and other signal strength algorithms can govern signal transmission (block 361). If, however, the device does not receive a ranging response (the "no" path), then the device can resend the ranging sequence at a signal strength equal to the initial signal strength plus a step value (D) (block 362). The value of D can be calculated using the calculations discussed above.

After resending the ranging sequence at an increased signal strength (block 362), the device can again wait to receive a ranging response (block 360). If it receives the ranging response (the "yes" path), then a network connection has been established (block 361). If it again does not receive the ranging response (the "no" path), then the device can again resend the ranging sequence at a signal strength equal to the previous signal strength plus D (the initial signal strength plus 2*D) (block 362). The device can continue incrementally raising its transmission strength until the device receives a ranging response (block 361, the "yes" path).

For ease of discussion, the foregoing description has been provided for a particular base station. As a mobile device moves between or among base stations, different variable values for different base stations can be acquired. A mobile device may store such values for a plurality of base stations, potentially expediting the establishment of a connection based on identification of the base station, rather than on receiving necessary values repeatedly from that base station every time the mobile device comes within range. A mobile station may be able to store values for commonly acquired base stations, for example, when a mobile device user travels in range of certain base stations more frequently than others. For stations such as WiMAX base stations, which have larger ranges, this may require storage of fewer values than for base stations with smaller ranges.

Various modifications to these embodiments can be made, and the generic principles and specific examples defined herein may be applied to other embodiments. For example, some or all of the features of the different embodiments discussed above may be deleted from the embodiments. In addition, one or more steps of the method described above may be performed in a different order or concurrently and still achieve desirable results. Therefore, the present invention is not intended to be limited to the embodiments described herein but is to be accorded the widest scope defined only by the claims below and equivalents thereof.

What is claimed is:

1. A method comprising:
   determining, by a mobile user device, an uplink propagation path loss (L) value between the mobile user device and a base station;
   determining, by the mobile user device, a noise and interference level (NI) value for the base station;
   determining, by the mobile user device, a normalized carrier-to-noise (C/N) value for ranging;
   determining, by the mobile user device, an offset value (offset);
   transmitting a ranging sequence at an initial signal strength (PINITIAL) determined by the mobile user device from the mobile user device to the base station, wherein PINITIAL is a function of L, NI, C/N, and the offset value,
   the method further comprising:
   (i) determining if a ranging response is received from the base station;
   (ii) if a ranging response from the base station is not received within a period of time, incrementing the initial signal strength by a step value (D) and retransmitting the ranging sequence, wherein D=(PMAX−PINITIAL)/K, where PMAX is a maximum signal strength and K is an integer greater than or equal to 1 and,
   (iii) repeating (i) and (ii) until the ranging response is received at the mobile user device transceiver.

2. The method of claim 1, wherein $P_{INITIAL}$=L+NI+C/N+offset.

3. The method of claim 1, wherein transmitting the ranging sequence occurs on a WiMAX network.

4. The method of claim 1, wherein L=$BS_{EIRP}$−RSSI, where RSSI is a received signal strength indication determined by the mobile user device and $BS_{EIRP}$ is an equivalent isotropic radiated power included in a broadcast message from the base station.

5. The method of claim 1, wherein the value of NI is provided by a broadcast message from the base station.

6. The method of claim 1, wherein the value of NI is equal to a previously used value for NI.

7. The method of claim 1, wherein the value of C/N is provided by a broadcast message from the base station.

8. The method of claim 1, wherein the offset value is equal to a previously used offset value.

9. Processing circuitry in a mobile user device for setting an initial signal transmission strength, said processing circuitry operable to:
   determine an uplink propagation path loss (L) value between the mobile user device and a base station;
   determine a noise and interference level (NI) value for the base station;
   determine a normalized carrier-to-noise (C/N) value for ranging; determine an offset value;
   transmit a ranging sequence at an initial signal strength (PINITIAL) from the mobile user device to the base station, wherein PINITIAL is a function of L, NI, C/N, and the offset value;
   (i) determine if a ranging response is received from the base station;
   (ii) if a ranging response from the base station is not received within a period of time, incrementing the initial signal strength by a step value (D) and retransmitting the ranging sequence, wherein D=(PMAX−PINITIAL)/K, where PMAX is a maximum signal strength and K is an integer greater than or equal to 1; and,
   (iii) repeating (i) and (ii) until the ranging response is received at the mobile user device.

10. The processing circuitry of claim 9, wherein $P_{INITIAL}$=L+NI+C/N+offset.

11. The processing circuitry of claim 9, wherein the transmitting occurs on a WiMAX network.

12. The processing circuitry of claim 9, wherein L=$BS_{EIRP}$−RSSI, where RSSI is a received signal strength indication and $BS_{EIRP}$ is an equivalent isotropic radiated power included in a broadcast message from the base station.

13. The processing circuitry of claim 9, wherein the value of NI is provided by a broadcast message from the base station.

14. The processing circuitry of claim 9, wherein the value of NI is equal to a previously used value for NI.

15. The processing circuitry of claim 9, wherein the value of C/N is provided by a broadcast message from the base station.

16. The processing circuitry of claim 9, wherein the offset value is equal to a previously used offset value.

* * * * *